United States Patent [19]
Fetter, Jr. et al.

[11] Patent Number: 5,146,831
[45] Date of Patent: Sep. 15, 1992

[54] QUICK RELEASE CUTTING HUB ASSEMBLY

[75] Inventors: Richard H. Fetter, Jr., County of Bay; Jerry L. Austin, County of Saginaw; Robert A. Hewitt, County of Bay, all of Mich.

[73] Assignee: The Conair Group, Inc., Pittsburgh, Pa.

[21] Appl. No.: 768,825

[22] Filed: Sep. 30, 1991

[51] Int. Cl.⁵ .......................... B26D 7/26; B29B 9/06
[52] U.S. Cl. ......................................... 83/698; 83/349; 83/356.3; 411/341; 425/184; 425/188; 425/190; 425/196; 425/DIG. 230
[58] Field of Search ............... 83/698, 581, 481, 356.3, 83/349; 425/184, 188, 190, 192 R, 196, 311, 313, DIG. 230; 264/141, 142; 403/1, 49, 319, 330; 411/340, 341, 342, 345

[56] References Cited

U.S. PATENT DOCUMENTS

| | | | |
|---|---|---|---|
| 948,237 | 2/1910 | Mills | 411/340 X |
| 2,246,834 | 6/1941 | Bowman | 411/342 |
| 2,287,117 | 6/1942 | Montalto | 411/340 X |
| 2,324,687 | 7/1943 | Finkle | 411/341 |
| 2,840,398 | 6/1958 | Chapellier | 411/342 X |
| 3,832,114 | 8/1974 | Yoshida | 425/313 |
| 3,861,268 | 1/1975 | Jaggers | 411/340 |
| 3,948,133 | 4/1976 | Diehm et al. | 83/356.3 X |
| 4,019,414 | 4/1977 | Thomas, Jr. et al. | 83/356.3 |
| 4,123,207 | 10/1978 | Dudley | 425/311 |
| 4,184,833 | 1/1980 | Buchan et al. | 425/311 |
| 4,251,198 | 2/1981 | Altenburg | 425/67 |
| 4,285,652 | 8/1981 | Anders | 425/313 X |
| 4,290,742 | 9/1981 | Scharer et al. | 425/313 |
| 4,300,877 | 11/1981 | Andersen | 426/67 |
| 4,422,372 | 12/1983 | Hoezee | 425/311 X |
| 4,529,370 | 7/1985 | Holmes et al. | 425/142 |
| 4,614,307 | 9/1986 | Lauser | 425/313 X |
| 4,728,276 | 3/1988 | Pauley et al. | 425/67 |
| 4,962,683 | 10/1990 | Scheffer et al. | 83/103 |
| 5,017,119 | 5/1991 | Tokoi | 425/142 |

FOREIGN PATENT DOCUMENTS

| | | | |
|---|---|---|---|
| 508455 | 12/1954 | Canada | 411/342 |
| 10927 | 9/1980 | Fed. Rep. of Germany | 411/340 |
| 790374 | 11/1935 | France | 411/340 |
| 780499 | 8/1957 | United Kingdom | 411/341 |

Primary Examiner—Frank T. Yost
Assistant Examiner—Clark F. Dexter
Attorney, Agent, or Firm—Buchanan Ingersoll

[57] ABSTRACT

I provide the quick release cutting hub assembly for a pelletizer with a cutting plane formed between a cutter and a die plate comprising a pelletizer shaft having a bore, a cutter assembly supporting the cutter and a support means mounted on one end of the pelletizer shaft and supporting the cutter assembly and having a spring means in compression urging the cutter assembly toward the cutting plane and also having a quick release means mounted within the support means for releasing the cutter assembly from the shaft. The quick release means when actuated bears against the cutter assembly and is held in place due to the pressure exerted by the compression of the spring located in the support means.

9 Claims, 6 Drawing Sheets

QUICK RELEASE CUTTING HUB ASSEMBLY

BACKGROUND OF THE INVENTION

1. Field of Invention

This invention relates to a quick release cutting assembly for use with a die plate pelletizer and more particularly to a cutting assembly having a cutter assembly which supports knives and which is urged toward a cutting plane formed between the knives and the die plates by a spring means and a counter-weighted quick lock (release) mechanism mounted within a support means.

2. Description of Prior Art

In order to cut synthetic resin extruder into pelletizing granules in a pelletizer apparatus, it is conventional practice to position the cutter blades in a juxtaposition to the die plates by means of rigid adjustment mechanisms such as adjustment bolts and lock nuts. These mechanisms must often be manually adjusted causing considerable inefficiency and down-time for the production of granules or pellets. The blades are adjusted to the proper clearance just short of contact with the die plate by adjustment bolts or screws.

Further, in conventional practice, cutting blades may be adjusted by means of a piston/cylinder mechanism. The blades are then replaced or serviced by de-energizing the piston and cylinder device so that the piston may be moved outwardly from the cylinder to distance the blades from the die plate.

Also, traditionally, the advance of a knife shaft in a pelletizer apparatus has been effected by a hydraulic-cylinder device, an air pressure device or a fluid-pressure device.

Frequently, spring steel blades are pressed against the perforated die plates of a pelletizer apparatus and are held in place by threading a locking nut onto an input shaft. This present technology causes the spring steel knife to wear very quickly resulting in a short working life and the necessity of frequent blade replacements.

Another known means of adjustment of the cutter blades in relation to the die plates is by sensing conductivity between the die face and a cutter assembly carrying blades by means of a micro-computer which processes the information to effect an axial movement of the hub toward the die plate upon a wearing of the blades so as to maintain a precise predetermined distance between the blades and the die plate.

These conventional practices require continual manual readjustment during operation. The cutter blades relative to the die plates are rigidly positioned or affixed to a hub assembly which results in the necessity of frequent blade adjustments and replacements. These installations and/or replacements cause the present technology to be operator intensive due to the short working life of the blades.

SUMMARY OF THE INVENTION

I provide the quick release cutting hub assembly for a pelletizer with a cutting plane formed between a cutter and a die plate comprising a pelletizer shaft having a bore, a cutter assembly supporting the cutter and a support means mounted on one end of the pelletizer shaft and supporting the cutter assembly and having a spring means in compression urging the cutter assembly toward the cutting plane and also having a quick release means mounted within the support means for releasing the cutter assembly from the shaft. The quick release means when actuated bears against the cutter assembly and is held in place due to the pressure exerted by the compression of the spring located in the support means.

My quick release cutting hub, because of the constant compression of the spring means, also permits the knives of the pelletizer apparatus to be spring-biased against the cutting plane and therefore self-adjusting.

Removal and installation of a new cutter assembly is performed with efficiency and ease. A cutter assembly is installed onto the indexing means integral with the pelletizer shaft. A separate, detachable lever, the pin puller, is then used to engage the support means. The support means is pulled away from the pelletizer shaft. This movement compresses the spring means and causes the quick release means (which is counter-weighted at its radial end) to rotate in a clockwise position to be in parallel to the lower surface of the cutter assembly. Once the pin puller is disengaged, the quick release means abuts against the cutter assembly, thereby urging the knives against the die plate, forming a cutting plane.

Once the pin puller again pulls the support means away from the pelletizer shaft, the quick release means is moved into the support means in a vertical position and the force of the compressed spring causes the tension pin to be withdrawn into the bore of the pelletizer shaft. This movement allows the cutter assembly to be released from the indexing means of the pelletizer shaft. The knives may then be easily replaced in the cutter assembly. After replacement of such knives, the cutter assembly is slipped onto the indexing means, the pin puller is re-engaged, the spring is forced into a compressed state, the quick release means falls into a horizontal position and abuts or locks against the new or replaced cutter assembly. This installation and release is done quickly and efficiently.

Also, my quick release cutting hub diminishes blade wear due to the spring-bias action of the blades in the cutting plane. Because the knives are not affixed in a certain position by means of manual adjustment of screws or bolts, but rather by the flexible movement of the cutting assembly due to the spring, the knives have a longer working life with less cutting edge wear.

BRIEF DESCRIPTION OF THE DRAWINGS

Other details, objects and advantages of the invention will become apparent by the following description of preferred and alternative, but nonetheless illustrative, embodiments of my quick release cutting hub assembly with reference to the accompanying drawings, wherein.

BRIEF DESCRIPTION OF THE PREFERRED EMBODIMENT

Figure 1:
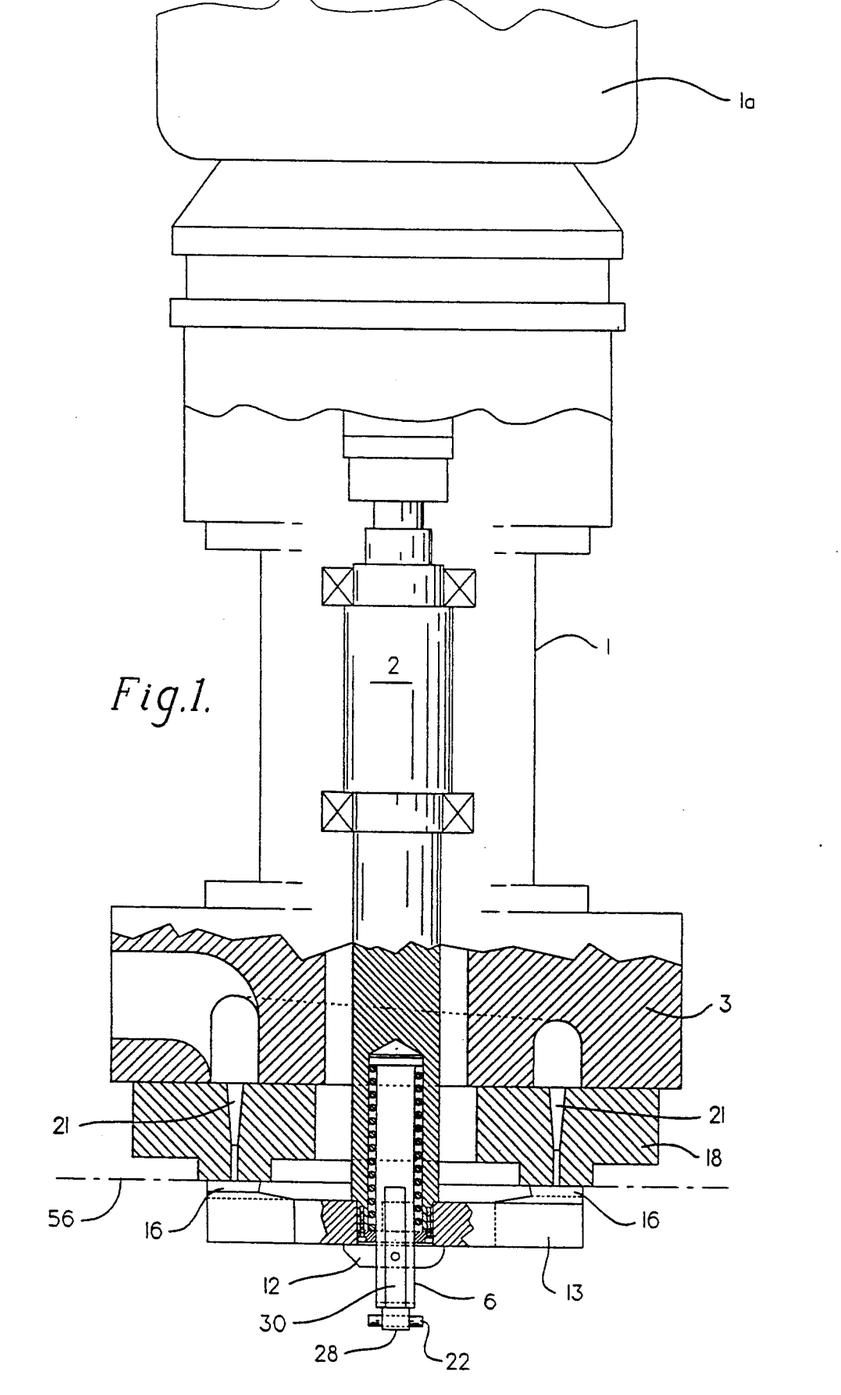
FIG. 1 is a general view of the cutting hub assembly partially in section.
Figure 9:
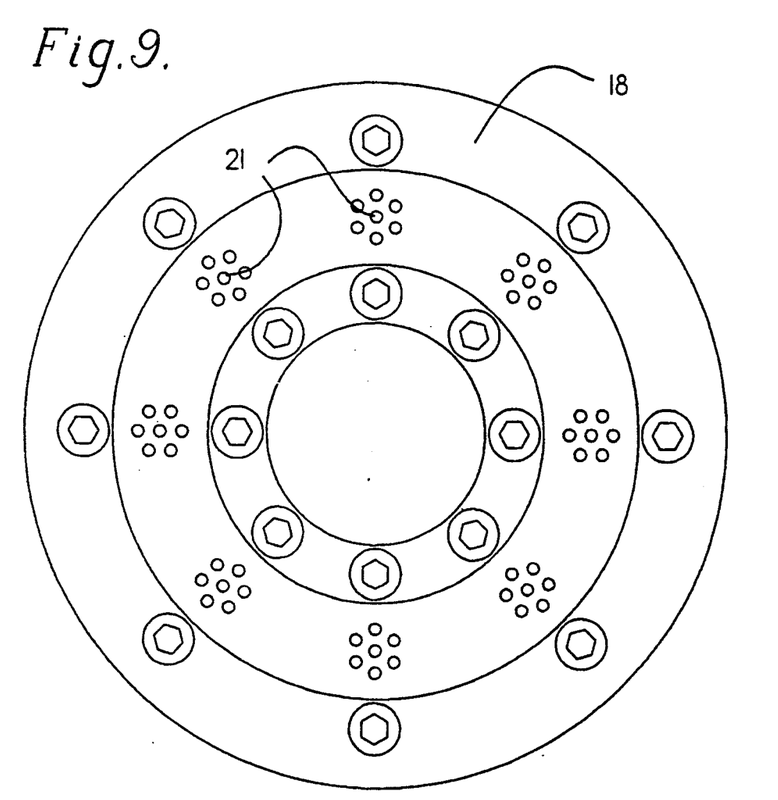
FIG. 9 is a front elevational view of the die plate.

Refer now to FIG. 1, there is illustrated an elevational view of the pelletizer shaft 2 and tension pin 6. The toggle 12 is in a locked position against the cutter assembly 13 which includes the knife 16. The pelletizer shaft 2 is suitably journaled within the housing 1. The pelletizer shaft is driven by a motor 1a. The cutting plane 56 is formed between the knife 16 (shown in FIG. 11) and the pelletizer die plate 18 (shown in FIG. 9). Synthetic resins are forced into the manifold 3 then through the extruder orifice 21 and exit onto the cutting plane 56 where the synthetic resins are cut into granular pellets by means of the conventional method of cutting using the rotary movement of the cutter assembly 13.

Figure 2:
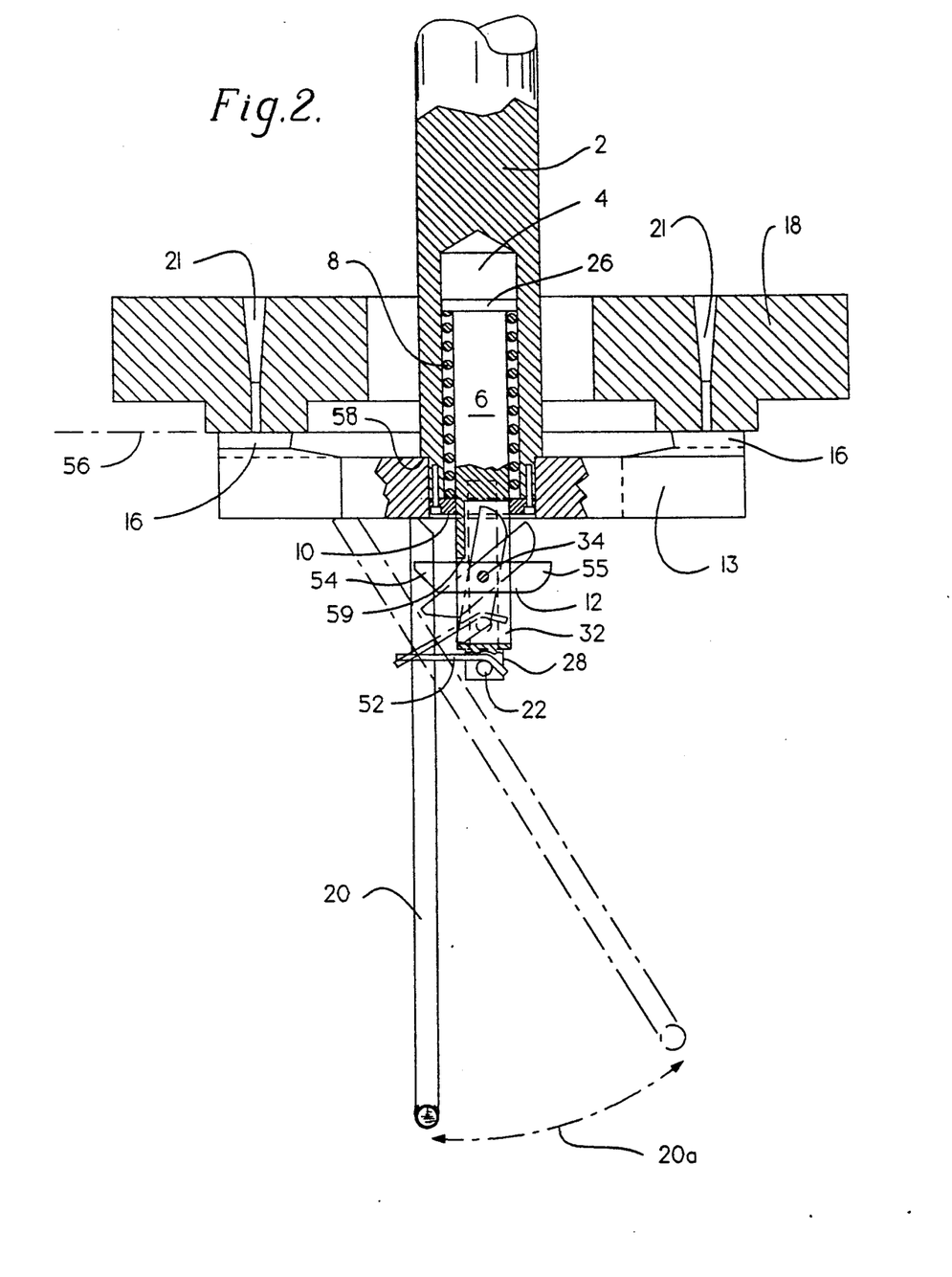
FIG. 2 is a pelletizer shaft of FIG. 1 showing a partial sectional view of the tension pin in its withdrawn position, with a view of the pin puller.
Figure 4:
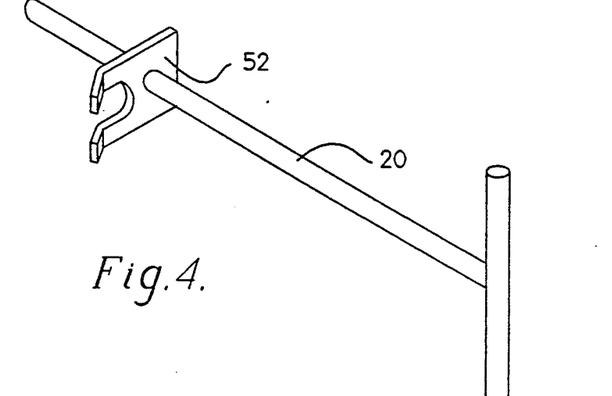
FIG. 4 is an isometric view of the pin puller shown in operation in FIG. 2.

FIG. 2 shows the pelletizer shaft 2 of FIG. 1 including a partial sectional of the tension pin 6 in its withdrawn position from the bore 4 in the pelletizer shaft 2, with a view of the pin puller 20. The reduced head 28 of the tension pin 6 is shown at a 90° pivot with respect to the toggle 12. The dowel pins 22 to be properly illustrated should be shown at a 90° angle aligning them parallel to the toggle 12. This illustration is depicted in FIG. 2 solely to show the working mechanism of the pin puller 20 (isometrically shown in FIG. 4). When the bifurcated blade 52 of the pin puller 20 is engaged upon the pair of dowel pins 22 and the pin puller is moved in a clockwise motion shown by the arc 20a, it forces the tension pin 6 to be pulled out of the pelletizer shaft 2, thereby compressing the helical spring 8. The helical spring 8 surrounds the tension pin 6 and abuts against the flange 26 in a somewhat compressed state. The helical spring 8 also at its second end abuts the spring keeper 10. The spring 8 permits the cutter assembly 13 to be spring-biased. This flexibility allows the knives 16 to self adjust to the cutting plane 56. The spring keeper 10 is held in place or attached to an indexing means or as shown in this embodiment, a machined hex end 42 (this indexing means may be in any configuration such as triangular, pentagonal, etc.) by means of a plurality of bolts 50. These bolts attach the spring keeper 10 to the machined hex end 42 so that the configurations of each of the hex end 42 and the spring keeper 10 are aligned. The tension pin has a reduced head 28 which contains a pair of dowel pins 22. As the tension pin is pulled from the pelletizer shaft 2, the helical spring 8 is forced into a compressed state by means of its containment between the flange 26 and the spring keeper 10. Once the transverse slot 32 (shown in FIGS. 5 and 5A) fully passes the cutter assembly 13, the toggle 12 is released into a horizontal position which is transverse to the axis of the tension pin. This releasing action is caused because the toggle 12 has a counter-weighted end 55 with a radial edge opposite its other end 54. The counter weighted end 55 rotatably turns in a clockwise position causing the toggle 12 to be in parallel to the lower surface of the cutter assembly 13. The toggle 12 is held in place in the tension pin 6 by a pin 34. While the toggle 12 is releasing from the tension pin 6, the pin puller 20 is holding the cutter assembly 13 against the pelletizer die plate 18. Once the pin puller 20 is moved counter-clockwise to the chained-line position shown in FIG. 2, the toggle 12 maintains a parallel position to the lower surface of the cutter assembly 13 and hold the cutter assembly 13 against shoulder 58 of shaft 2.

Figure 3:
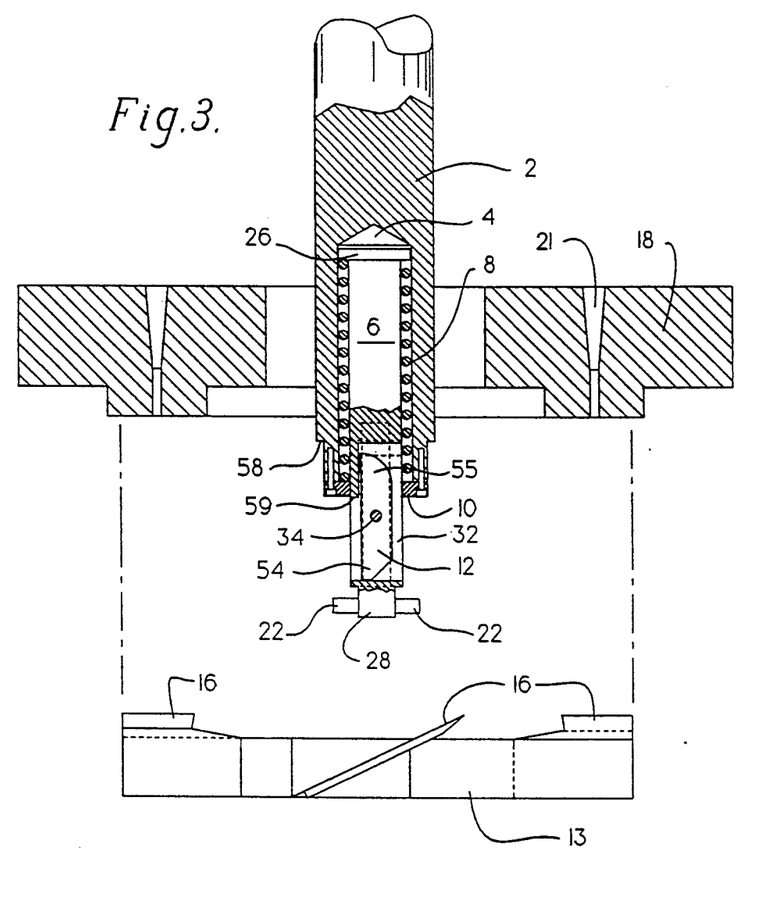
FIG. 3 is a view similar to FIG. 2 showing a partial sectional view of the tension pin in its retracted position with the cutter assembly removed.

Now referring to FIG. 3, this retraction of the tension pin 6 into the bore 4 with the toggle 12 in axial alignment within the transverse slot 32 of tension pin 6 allows the quick release of the cutter assembly 13 from the pelletizer shaft 2. This permits the knives 16 to be quickly replaced or a new cutter assembly 13 to be installed onto the pelletizer shaft 2. A new cutter assembly 13 with new knives can be indexed onto the machined hex-end 42. The pin puller 20 is then inserted upon the dowel pins 22 and is rotated in a clockwise position withdrawing the tension pin 6 from the bore 4. This enables the toggle 12 to rotate in a clockwise position about pin 34. The counter-weighted end 55 urges the clockwise movement of toggle 12 until the toggle keeper 12 is in a transverse position with respect to the longitudinal axis of the tension pin 6. The toggle 12 rotates in a clockwise position until the end 54 abuts the stop 59 located in transverse slot 32.

Figure 5:
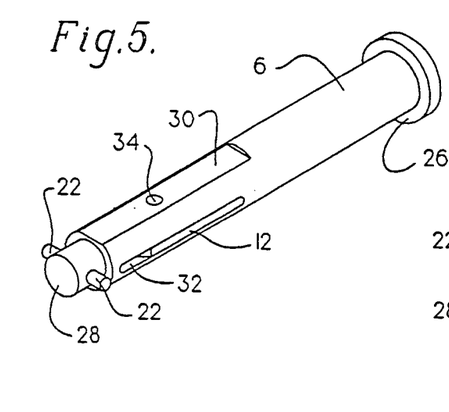
FIG. 5 is an isometric view of the tension pin having the toggle keeper coaxially aligned within the tension pin.
Figures 6, 7:
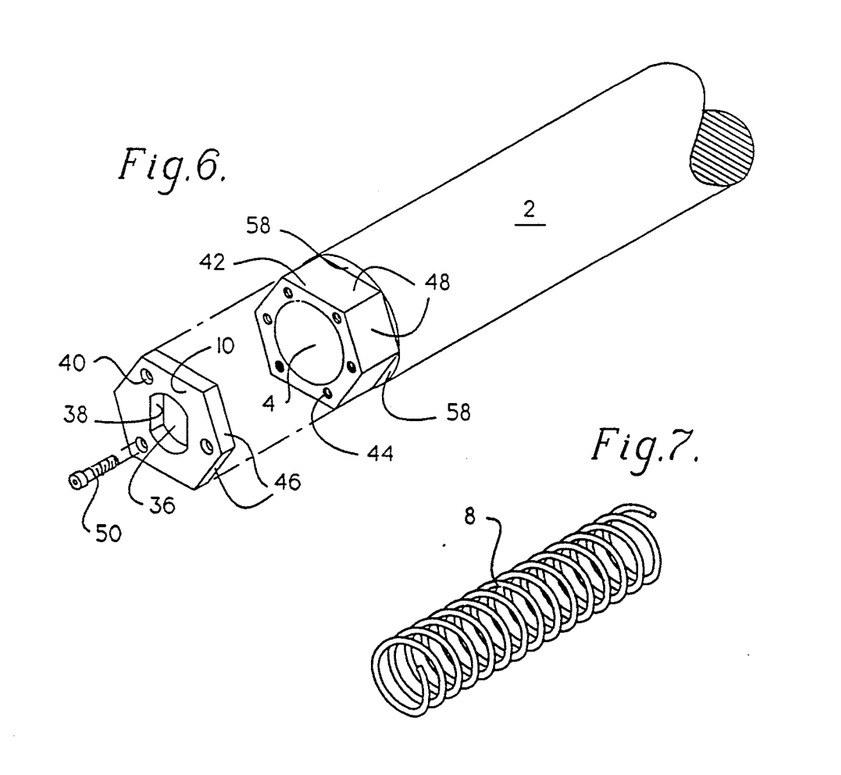
FIG. 6 is a fragmentary isometric view of the pelletizer shaft and spring keeper exploded therefrom.
FIG. 7 is an isometric view of the helical spring.

As seen in FIG. 5, the flange 26 is located at one end of tension pin 6 and is used to contain the helical spring 8 (isometrically shown in FIG. 7). FIG. 5 also shows the reduced head 28 of the tension pin 6 including the pair of dowel pins 22 which are engaged by the pin puller 20 in order to release the cutter assembly 13 from the pelletizer shaft 2.

Figure 5A:
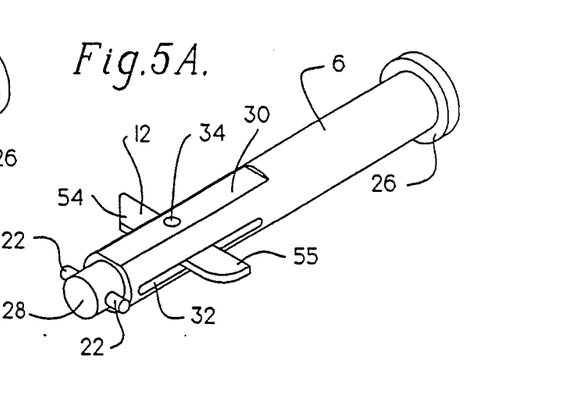
FIG. 5A is an isometric view of the tension pin having the toggle transverse to the axis of the tension pin.

FIG. 6 shows a fragmentary isometric view of the pelletizer shaft 2, the machined hex end 42 and the spring keeper 10 exploded therefrom. The machined hex end 42 integral with the pelletizer shaft 2 has a plurality of threaded holes 44. The flats 48 of the machined hex end 42 correspond directly in configuration with the flats 46 of the spring keeper 10. To align this configuration, the spring keeper 10 is attached to the machined hex end 42 by means of a plurality of bolts 50 which are placed into the plurality of holes 40 in the spring keeper 10. The interior space of the machined hex end 42 shows the bore 4 of the pelletizer shaft 2. The spring keeper 10 has a hole 36 having a pair of flats 38 which correspond to the opposed paired flat surfaces 30 of the tension pin 6. The opposed paired flat surfaces 30 of the tension pin 6 are depicted in FIGS. 5 and 5A. Opposed paired flat surfaces 30 in combination with the pair of flats 38 of the spring keeper 10 ensure that the tension pin is oriented properly within bore 4 of pelletizer shaft 2. The shoulder 58 at the machined hex end 42 of pelletizer shaft 2 acts as a stop for the cutter assembly 13 when the cutter assembly 13 is engaged onto the pelletizer shaft 2.

Figure 8:
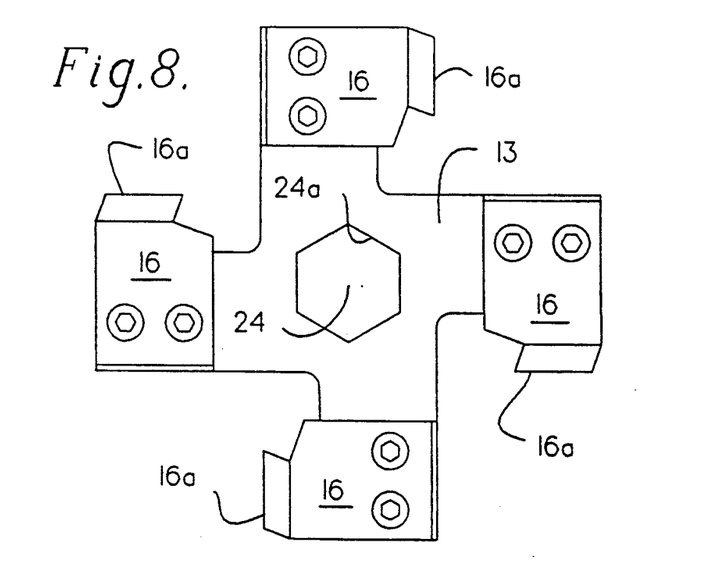
FIG. 8 is a front elevational view of the cutter assembly.
Figure 10:
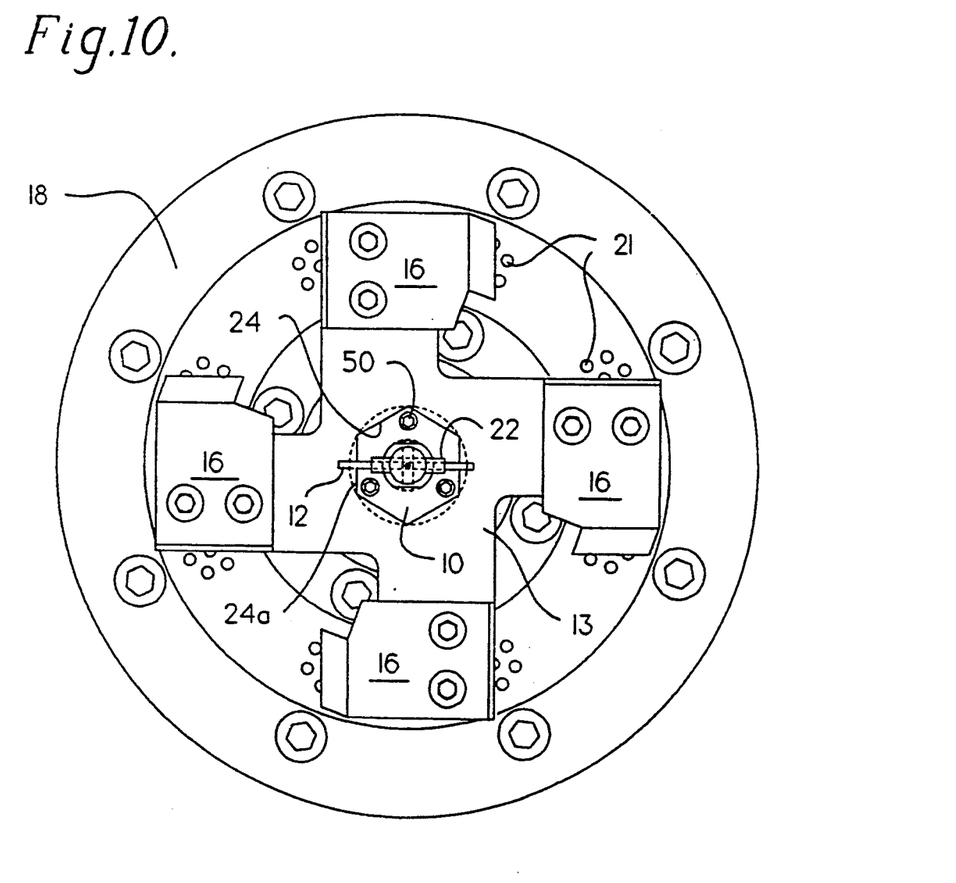
FIG. 10 is a front elevational view of the die plate having the cutter assembly positioned on it.

FIG. 10 shows a front elevational view of the cutter assembly 13. This cutter assembly 13 is comprised of a plurality of knives 16 and a hexagonal bore 24 as shown in FIG. 8. The toggle 12 is shown in FIGS. 1 and 10 in a locked position abutting the cutter assembly 13. The plurality of holes 40 are shown in the spring keeper 10 which is bolted to the machined hex end 42 (now shown) by means of a plurality of bolts 50. FIG. 10 also illustrates that the locked position of the toggle 12 abuts the cutter assembly 13 across the flats 24a of the hexagonal bore 24. This position allows the most retaining surface of the toggle 12 to abut against the cutter assembly 13. The pair of dowel pins 22 is also shown in FIG. 10. The opposed paired flat surfaces 30 of tension pin 6 always maintain the orientation of the toggle 12 with respect to the flats 24a of the hexagonal bore 24 to ensure the maximum surface distance at the ends 54 and 55 of the toggle 12 against the lower surface of the cutter assembly 13.

Figure 11:
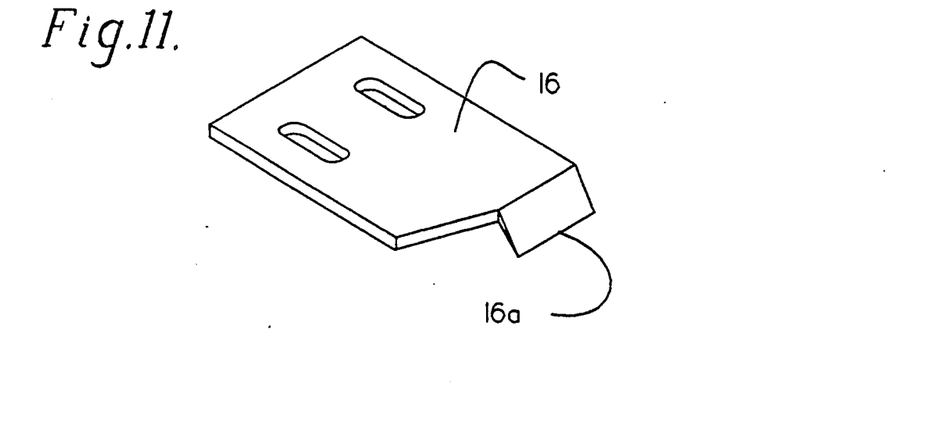
FIG. 11 is an isometric view of a knife.

FIG. 11 shows knife 16 with cutting edge 16a.

While the principals of the invention have now been made clear in an illustrative embodiment, there will be immediately obvious to those skilled in the art, many modifications of structure, arrangements, components and materials used in the practice of the invention which are particularly adapted for specific environments and structural configurations without departing from those principles.

I claim:

1. A quick release cutting hub assembly for a pelletizer with a cutting plane formed between a cutter and a die plate comprising:
   a. a pelletizer shaft having two ends and a bore at one end;
   b. a cutter assembly supporting the cutter; and
   c. a support means mounted on the end of the pelletizer shaft having the bore and partially extending into the bore and partially extending outside of the bore and supporting the cutter assembly and having a spring means completely within the bore in compression urging the cutter assembly toward the cutting plane and having a quick release means pivotally mounted within the support means for supporting the cutter assembly in a first position and releasing the cutter assembly from the shaft in a second position.

2. A cutting hub assembly as defined in claim 1 wherein the pelletizer shaft is mounted at the other end to a housing.

3. A cutting hub assembly as defined in claim 1 wherein the cutter assembly includes an axial opening shaped to conform to an exterior shape of one end of the pelletizer shaft having the bore and to engage the one end of the shaft having the bore.

4. A cutting hub assembly as defined in claim 3 wherein the axial opening is in the shape of a hex.

5. A cutting hub assembly as defined in claim 1 wherein the support means includes a tension pin having a flange located at a first end of the tension pin against which the spring means contacts, a pair of opposed flat surfaces adjacent a second end of the tension pin, and a transverse slot between the opposed flat surfaces.

6. A cutting hub assembly as defined in claim 5 wherein the quick release means includes a toggle pivotally mounted within the slot, the toggle having a first end and a second end, the second end having a radial edge and a counter-weight to assist rotation of the toggle from a position of vertical alignment within the slot to permit release of the cutter assembly to a horizontal position for supporting the cutter assembly.

7. A cutting hub assembly as defined in claim 6 including a pin puller means having a bifurcated blade which engages dowel pins attached to the second end of the tension pin, the pin puller means moveable from a first position to a second position which pulls the tension pin away from the end of the pelletizer shaft thereby permitting the toggle to move into the slot in the tension pin enabling the cutter assembly to drop from the shaft.

8. A cutting hub assembly as defined in claim 5 including a spring keeper mounted at one end of the shaft, the spring keeper supporting an end of the spring means opposite the end of the spring means in contact with the flange having a slot shaped to receive the flat surfaces of the tension pin, wherein the spring means is maintained in a state of compression between the spring keeper and the flange of the tension pin.

9. A cutting hub assembly as defined in claim 8 wherein the spring keeper has at least two different diameters of different distances, the toggle abuts against the cutter assembly in a transverse position across the shortest diameter of the spring keeper.

* * * * *

UNITED STATES PATENT AND TRADEMARK OFFICE
CERTIFICATE OF CORRECTION

PATENT NO. : 5,146,831

DATED : September 15, 1992

INVENTOR(S) : RICHARD H. FETTER, JR., JERRY L. AUSTIN, ROBERT A. HEWITT

It is certified that error appears in the above-identified patent and that said Letters Patent is hereby corrected as shown below:

On the title page:

At [56] References Cited, Foreign Patent Documents, Patent No. 10927 (Fed. Rep. of Germany) change "9/1980" to --9/1880--.

Column 4, line 59, change "now" to --not--.

Signed and Sealed this

Fourteenth Day of September, 1993

Attest:

BRUCE LEHMAN

*Attesting Officer*  *Commissioner of Patents and Trademarks*